US008266033B2

(12) United States Patent
Larsen et al.

(10) Patent No.: US 8,266,033 B2
(45) Date of Patent: Sep. 11, 2012

(54) NEGOTIABLE INSTRUMENT ELECTRONIC CLEARANCE SYSTEMS AND METHODS

(75) Inventors: Jeannie Larsen, Aurora, CO (US);
Allen Hofmann, Littleton, CO (US);
Eyal Tzarfati, Centennial, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 13/405,831

(22) Filed: Feb. 27, 2012

(65) Prior Publication Data
US 2012/0158727 A1    Jun. 21, 2012

Related U.S. Application Data

(63) Continuation of application No. 12/557,719, filed on Sep. 11, 2009, now Pat. No. 8,150,751.

(51) Int. Cl.
*G06Q 99/00* (2006.01)
*G06F 7/00* (2006.01)

(52) U.S. Cl. ............ 705/35; 705/318; 707/737; 707/752

(58) Field of Classification Search .................. 705/318; 707/737, 752
See application file for complete search history.

(56) References Cited

U.S. PATENT DOCUMENTS

| 7,133,844 B2 * | 11/2006 | Park et al. ........................ 705/50 |
| 8,150,751 B2 | 4/2012 | Larsen et al. |
| 2002/0138417 A1 * | 9/2002 | Lawrence ........................ 705/38 |
| 2004/0117316 A1 * | 6/2004 | Gillum .............................. 705/64 |
| 2004/0215558 A1 * | 10/2004 | Morales et al. .................. 705/39 |
| 2005/0102210 A1 * | 5/2005 | Song et al. ........................ 705/35 |
| 2008/0061136 A1 * | 3/2008 | Hoch et al. ..................... 235/380 |
| 2008/0140579 A1 * | 6/2008 | Sanjiv ............................. 705/76 |
| 2008/0162319 A1 | 7/2008 | Breeden et al. |
| 2009/0132420 A1 * | 5/2009 | Silverbrook et al. ........... 705/50 |
| 2010/0063927 A1 | 3/2010 | Davis et al. |
| 2011/0066564 A1 | 3/2011 | Larsen et al. |

OTHER PUBLICATIONS

Payments Perspective 1Q 2010 The Clearing House Payments Company LLC.*
Team Effort to Lead X9 X9 Standard Fall 2008.*
Author Unknown, "Team Effort to Lead X9," X9™ Standard, Fall 2008, 4 pages.
*PayrnentsPerspective*, First Quarter 2010, The Clearing House Payments Company L.L.C., 2010, 24 pages.

* cited by examiner

*Primary Examiner* — William Rankins
(74) *Attorney, Agent, or Firm* — Kilpatrick Townsend & Stockton LLP

(57) ABSTRACT

Methods, devices, and systems for analyzing negotiated negotiable instruments for unlawful activity are described. A computer system, including a computer readable storage device and a processor may be provided. A plurality of electronic files may be received. Each of these electronic files of the plurality of electronic files may include an electronic image of at least a portion of a negotiable instrument and include a plurality of data fields. The plurality of electronic files may be divided into subsets based on whether data is available in particular data fields of the electronic files. Based upon the subset an electronic file is made a member of, various selection criteria may be applied to determine if the electronic file is a candidate for suspicious and/or illegal activity. Also, a listing of candidates for suspicious and/or illegal activity may be presented to a user.

20 Claims, 5 Drawing Sheets

NEGOTIABLE INSTRUMENT ELECTRONIC CLEARANCE SYSTEMS AND METHODS

CROSS-REFERENCES

This application is a continuation of U.S. patent application Ser. No. 12/557,719, filed Sep. 11, 2009, entitled "NEGOTIABLE INSTRUMENT ELECTRONIC CLEARANCE SYSTEMS AND METHODS," which is hereby incorporated by reference in its entirety for all purposes.

BACKGROUND OF THE INVENTION

Historically, the clearing of negotiable instruments, such as checks and money orders, has been a paper intensive process. For example, a customer may enter a financial institution, such as his bank, and present a negotiable instrument for a particular monetary value to be cashed or deposited. The bank or financial institution, referred to as the "bank of first deposit," may then present the customer with the monetary value of the negotiable instrument. In many instances, the bank or other financial institution that issued the negotiable instrument, referred to as the "issuing bank," is not the same as the bank of first deposit. Therefore, the bank of first deposit that has cashed or deposited the negotiable instrument must collect the appropriate monetary value from the issuing bank.

Typically, this would involve the bank of first deposit sending the negotiable instrument to their clearinghouse (alternatively referred to as their check processor). This clearinghouse may then route the negotiable instrument to second clearinghouse associated with the issuing bank. This second clearinghouse may process and verify the negotiable instrument. Thereafter, the clearinghouse may transmit or send funds to the bank of first deposit for the value of the negotiable instrument. Considering that banks and financial institutions must deal with cashing or depositing huge volumes of negotiable instruments on a daily basis, including negotiable instruments received from issuing institutions throughout the country and world, handling negotiable instruments is an expensive, time-consuming, and cumbersome process. Some banks or financial institutions may even go so far as to charter private airplanes to deliver negotiable instruments to the appropriate clearinghouse or check processor.

As may be expected, a percentage of transactions using negotiable instruments involve illegal, suspicious, or illicit activities. These illegal, suspicious, or illicit activities may include money laundering, such as funding for drug trafficking or terrorist activities. In some instances, banks and financial institutions may be under a legal obligation to investigate and/or report suspicious activity to an appropriate government agency. The problem of money laundering may be particularly pronounced when dealing with money orders.

A personal check may typically include certain information, such as the payor's identity, the bank account the funds are being withdrawn from, and the recipient's identity. Depending on the monetary value of the money order, not all of this information may be present or collected by either the issuing financial institution or the bank of first deposit for a money order. For example, the recipient's identity, the source of the funds, or the payor's identity may not be present on the money order. Therefore, it may be more difficult to determine if the negotiable instrument is being used for money laundering or other illicit or illegal activities.

In helping to prevent money laundering or other illegal or illicit activities, the delivery of negotiable instruments to the clearinghouse or check processor associated with the issuing financial institution may be considered to have certain advantages. For example, receiving the physical negotiable instrument allowed for certain characteristics of the physical negotiable instrument to be categorized, reviewed, and/or investigated. The negotiable instruments, that had been cashed or deposited and subsequently returned to the issuing financial institution (or the clearinghouse associated with the issuing bank), could be sorted according to varying criteria.

However, the process of physically moving paper negotiable instruments is being replaced by electronic negotiable instrument processing, or, in other words, the transmission of an electronic image of a negotiated instrument with associated data fields from the bank of first deposit (or its associated clearinghouse) to the issuing bank (or associated clearinghouse) as opposed to the physical negotiable instrument. In such an electronic processing scheme, the physical negotiable instrument may be destroyed once an associated image has been created. The methods to examine or investigate properties or aspects of the negotiable instrument may be changed in order to detect suspicious, illegal, and/or illicit activities in an electronic processing environment.

The following invention addresses this and other problems.

BRIEF SUMMARY OF THE INVENTION

Devices, systems, and methods are described for a novel architecture of negotiable instrument processing and/or analysis.

The analyzing and/or processing of negotiable instruments for illegal activity has previously been applied to physical negotiable instruments. However, under the Check Clearing for the 21st Century Act, negotiable instruments are increasingly being converted to an electronic format for processing and/or clearing due to, among other reasons, potential savings in processing time and cost. When an electronic file, such as a X9.37 format file, containing an image of a negotiable instrument is received at an issuing financial institution or at an issuing financial institution's clearinghouse, the electronic file may be evaluated according to various criteria. These criteria may classify the electronic files based on factors such as: a minimum or maximum monetary value of the imaged negotiable instrument contained within each electronic file, a deposit account number at the bank of first deposit the negotiable instrument was deposited into, a sequence number associated with the bank of first deposit (meaning, the order in which a negotiable instrument within an electronic file was deposited at the bank of first deposit), a sequence associated with the ECE (Electronic Check Exchange) institution, and/or a sequence associated with the endorsing bank's sequence number. Therefore, certain preferred factors may be used to evaluate electronic files of negotiable instruments if present, and other factors may be used if the preferred factors are not available. Based on these factors and other selection criteria, electronic files containing negotiable instruments may be analyzed to determine which electronic files, or groups of electronic files containing negotiable instruments should be further investigated for suspicious and/or illegal activity.

In some embodiments, a method for analyzing negotiated negotiable instruments for unlawful activity is described. A computer system, including a computer readable storage device and a processor may be provided. The method may include receiving, at the computer system, a plurality of electronic files. Each of these electronic files of the plurality of electronic files may include an electronic image of at least a portion of a negotiable instrument and include a plurality of data fields. The method may further include, storing at the computer readable storage device, the plurality of electronic files. The method may also include identifying a first subset of the plurality of electronic files. This identification may include an identifier being present in the same first data field. The method may also include preventing the first subset of the plurality of electronic files from being identified as part of another subset of the plurality of electronic files. The method may also include identifying a second subset of the plurality of electronic files. The electronic files of the second subset may have a second identifier present in the same second data field. The method further includes applying a first set of selection criteria to the first subset, to identify suspicious candidates from among the first set for unlawful activity, and applying a second set of selection criteria to the second subset to identify additional suspicious candidates from among the second subset for unlawful activity. Finally, the method may include displaying the suspicious candidates for unlawful activity to a user via a computer system.

In some embodiments, the negotiable instrument is a money order. In some embodiments, the negotiable instrument is a check. In some embodiments the method may further include grouping electronic files by origination data. This origination data may be a return location routing number. In some embodiments, the electronic files are in X9.37 format. In some embodiments, the first data field is configured to contain a deposit account number at the bank of first deposit. The second data field may be configured to contain a bank of first deposit sequence number. In some embodiments, the method also includes identifying electronic files from the plurality of electronic files below a minimum threshold monetary value and isolating the electronic files below the minimum threshold value from being added to a subgroup.

In some embodiments, a third subset is selected from among the second subset of the plurality of electronic files. The members of the third subset are in sequential order according to the bank of first deposit sequence number. The method may also include reordering members of the third subset according to the bank of first deposit item sequence number. The reordering includes electronic files containing negotiable instruments with the monetary value below the minimum threshold monetary value. The method may also include selecting a fourth subset from the reordered third subset. The fourth subset may include sequential electronic files according to the bank of first deposit item sequence number and electronic files having a greater monetary value than the minimum threshold monetary value.

In some embodiments, a method for analyzing electronic images of negotiable instruments for money laundering is described. The method may include providing a computer system, including a computer readable storage device and a processor. The method may also include receiving a plurality of electronic files. Each of the electronic files of the plurality of electronic files may include an electronic image of a negotiable instrument. Each electronic file of the plurality of electronic files may also include a plurality of data fields. Each negotiable instrument may also have a monetary value. The method may also include identifying a first group of electronic files that each contain a negotiable instrument that exceeds the threshold monetary value. The method may include sorting electronic files of the first group of electronic files into a plurality of subgroups. Each electronic file of the first group of electronic files may be only sorted into one subgroup. Further, the method may include identifying candidates for further analysis from each subgroup of electronic files according to selection criteria. The selection criteria applied to each subgroup may be different from the selection criteria applied to each other subgroup. The method may also include providing to a user a listing of the candidates for further analysis.

In some embodiments, the selection criteria applied to the first subgroup is based on a total monetary amount of monetary value deposited in a particular deposit account. In some embodiments, storing the first group of electronic files into the plurality of subgroups includes determining whether each electronic file is a member of a first subgroup prior to determining whether each electronic file is a member of a second subgroup. In some embodiments, the method includes a third subgroup that contains electronic files that were not sorted into any other subgroup, thereby functioning as an overflow subgroup.

In some embodiments, a method for analyzing images of negotiable instruments for money laundering may be present. The method may include providing a computer system, the computer system including a computer readable storage device and a processor. The method may also include receiving a plurality of X9.37 electronic files. Each X9.37 electronic file of the plurality of electronic files includes an electronic image of a negotiable instrument, a plurality of data fields. Each negotiable instrument within each X9.37 electronic file has an associated monetary value. The method may also include storing the plurality of X9.37 electronic files. The method may also include sorting the plurality of electronic files based on a monetary value threshold of each negotiable instrument within each X9.37 electronic file. The method further includes creating a first group comprised of electronic files that contain images of negotiable instruments greater than the monetary value threshold. The method also includes storing the first group of electronic files into subgroups. A first subgroup may be identified by an identifier being present in a "deposit account number at bank of first deposit" data field. A second subgroup may be identified by an identifier being present in a "bank of first deposit item sequence number" data field. Electronic files may be members of only one subgroup. The method also includes creating a candidate group for each subgroup according to selection criteria. The first subgroup is sorted according to a total monetary value of negotiable instruments containing a same identifier being present in the "deposit account number at bank of first deposit" data fields to create a first candidate group. The method also includes creating a listing of members of the first candidate group.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components.

DETAILED DESCRIPTION OF THE INVENTION

Figure 1:
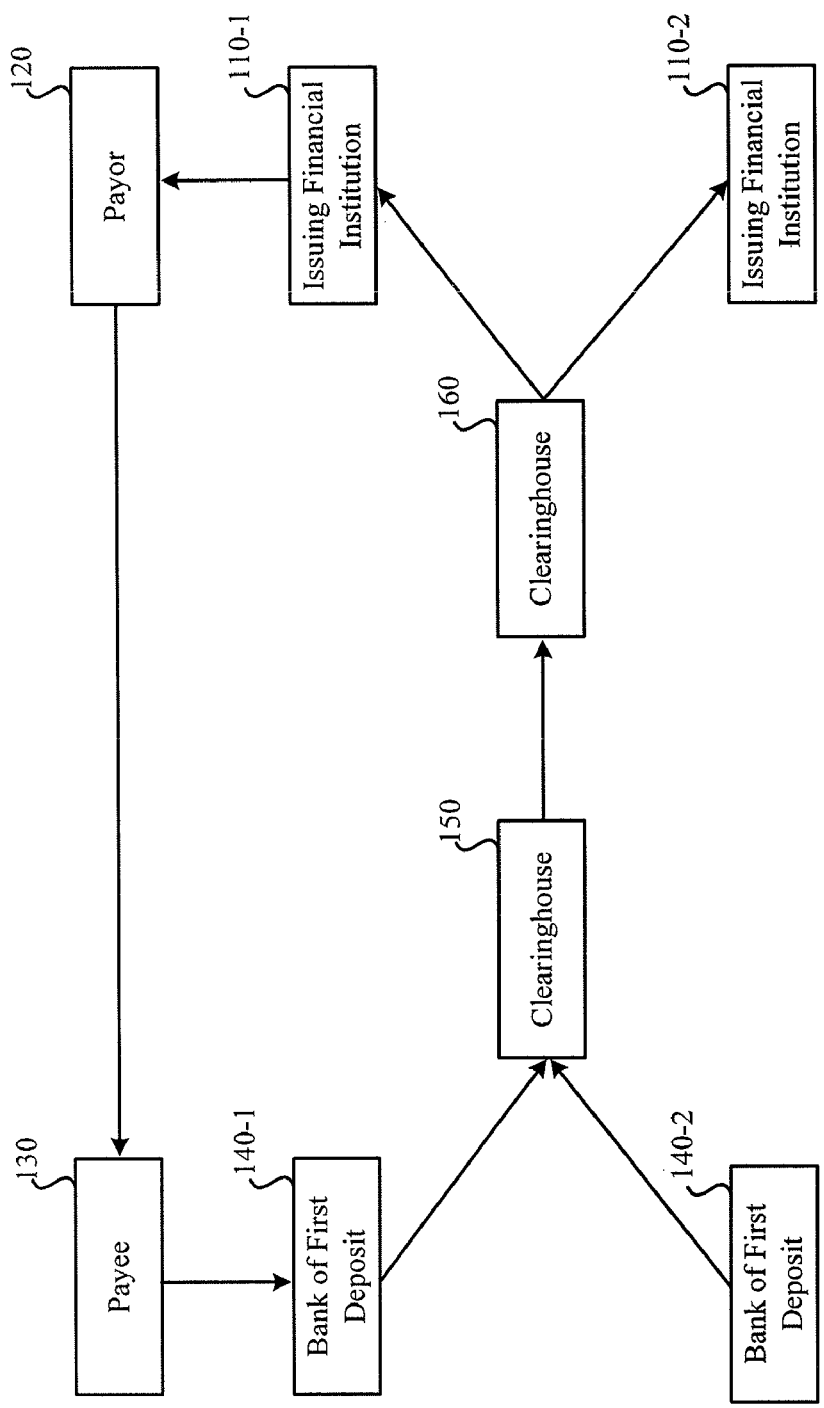
FIG. 1 is a simplified block diagram of an embodiment of a system for the use and processing of negotiable instruments.

Devices, systems, and methods are described for the implementation of a novel form of clearing, analyzing, and processing electronic negotiable instruments. Such clearing, analyzing, and processing of electronic negotiable instruments may be used to detect suspicious activity regarding the use of individual or groups of negotiable instruments. While such analyzing and processing may be applied to any negotiable instruments, such as personal checks, certified checks, bank checks, etc., such analyzing and processing may be especially useful when applied to money orders, due to a possible decreased amount of information gathered regarding the payor (the person sending money) and the payee (the person receiving money). In X9.37 format electronic files, a format commonly used for electronic transmission of negotiable instruments, an image of a negotiable instrument and various data fields may be present. However, it is not required that each of these data fields contain information. In other words, some of the data fields are required to be completed by financial institutions and some are optional. Therefore, while one bank of first deposit or clearinghouse may specify the account that a negotiable instrument is deposited into, another may not provide this information. Therefore, flexibility in analyzing negotiable instruments for illegal or suspicious activity may be necessary.

When an electronic file, such as a X9.37 format file, containing an image of a negotiable instrument is received at an issuing financial institution or at an issuing financial institution's clearinghouse, the electronic file may be evaluated according to various criteria. These criteria may classify the electronic files based on factors such as: a minimum or maximum monetary value of the imaged negotiable instrument contained within each electronic file, a deposit account number at the bank of first deposit the negotiable instrument was deposited into, a sequence number associated with the bank of first deposit (meaning, the order in which a negotiable instrument within an electronic file was deposited at the bank of first deposit), a sequence associated with the ECE (Electronic Check Exchange) institution, and/or a sequence associated with the endorsing bank sequence number. Not all of these factors may be able to be evaluated for each electronic file due to missing data (such as, due to incomplete optional data fields). Therefore, certain preferred factors may be used to evaluate electronic files of negotiable instruments if present, and other factors may be used if the preferred factors are not available. For example, in classifying an electronic file, if the electronic file contains the account number at the bank of first deposit the negotiable instrument was deposited into, the evaluation process may not consider the bank of first deposit item sequence number, or any other factor in classifying the electronic file.

One goal of this process, considering the large volumes of negotiable instruments (perhaps in the millions) that individual banks and financial institutions must process and/or clear on a daily basis, is to accurately identify negotiable instruments or groups of negotiable instruments that exhibit characteristics consistent with illegal or suspicious activities quickly and accurately. Further, the amount of "false positives" may wish to be minimized, thereby decreasing the number of electronic files mistakenly believed to involve suspicious activity.

Currently, many issuing financial institutions may be in the process of converting from systems that involve the physical delivery of cashed negotiable instruments from the bank of first deposit back to the issuing financial institution, to systems that include only the delivery of an electronic file (commonly a file in X9.37 format) containing an image of the negotiable instrument, along with various data fields that contain mandatory and optional information regarding the negotiable instrument and the processing of the negotiable instrument from the bank of first deposit to the issuing financial institution, or its associated clearinghouse. The conversion to electronic processing of negotiable instruments may be seen as being made possible by the Check Clearing for the 21st Century Act, colloquially referred to as the Check 21 Act. This law allows for the recipient of a paper check or other negotiable instrument, such as a money order, to create a digital version of the original negotiable instrument, thereby removing the need for preservation of the physical negotiable instrument.

The processing and transmission of negotiable instruments as electronic files have many obvious benefits, such as the speed of transmission, the ease of transmission, and the cost of transmission. However, at least from the standpoint of analysis for illegal or illicit activities, there may be several drawbacks to electronic processing of negotiable instruments. Consider the following example, provided for illustration purposes only: A drug trafficker is receiving a large payment for his shipment of "goods." In an attempt to avoid detection, the drug trafficker receives his payment anonymously using money orders. His buyer, as payment, sends him a dozen money orders each for thousands of dollars. The drug trafficker, along with several of his cohorts, go to a local bank, approach a teller, and have her cash the money orders.

At the bank, these may appear to be normal transactions. However, a later analysis by the issuing financial institution or the clearinghouse associated with the issuing financial institution when the cashed money order is returned for clearing may prove otherwise. For example, from the time of the money order being cashed by the drug trafficker and his cohorts, to the time the issuing financial institution or the clearinghouse associated with the issuing financial institution clears the cashed money orders, the money orders may remain approximately grouped if they all attended the same bank to cash the money orders. Based upon an analysis of this order as received by the issuing bank or the issuing bank's clearinghouse, it may be able to be determined that this group of transactions has a probability of involving illegal or illicit activities. For example, the negotiable instruments may be examined to find groups of sequentially processed negotiable instruments that, in total, were cashed for more than $5,000. Following this, the issuing financial institution may notify, as required by law, the appropriate government agency, and/or refuse to fund the associated negotiable instruments.

However, such an analysis may yield many false positives because groups of negotiable instruments from multiple banks of first deposit are being processed following each other. Therefore, it is possible to have groups of sequential money orders total over $5,000, but were cashed at banks of first deposit with no relation to each other (indicating a lack of suspicious activity), such as located thousands of miles apart. Processing and/or analyzing electronic files of negotiable instruments may help to decrease false positives such as these.

In addition to information such as the order the negotiable instrument was received in the teller's till, other information that may be used for analyzing a physical negotiable instrument for clearing may not be available if the physical negotiable instrument is not returned to the issuing bank or the issuing bank's clearinghouse. Therefore, in order to comply with government regulations, identifying a high percentage of illegal or suspicious transactions involving negotiable instruments, and minimizing the number of false positives (that is, transactions that are legitimate, but were initially determines to be suspicious) new and/or modified processing and/or analyzing may be conducted by issuing financial institutions to clear and/or analyze negotiable instruments.

FIG. 1 is a simplified block diagram of a system 100 for the use, processing, and clearing of a negotiable instrument, such as a check or a money order. While the following description refers to a money order, one with skill in the art will recognize that any negotiable instrument may be used. Initially, payor 120 may determine that he wishes to give payee 130 a sum of money. Payor 120 may use a check, such as a personal check, a bank check, or certified check. However, payor 120 may not know or wish to divulge all of the information necessary to create one of these forms of checks to be issued to payee 130. Further, payor 120 may not know or wish to disclose the name of payee 130. Payor 120 may decide to have a negotiable instrument for the amount he wishes to pay payee 130 created. Instead, payor 120 may have a money order created. Such a money order may not require any information, or only limited information, to be divulged about the payee 130 or payor 120.

If payor 120 decides to send payee 130 a money order, she may contact an issuing financial institution that issues money orders. In FIG. 1, issuing financial institution 110-1 issues money orders. Payor 120 may obtain the money order for the amount he desires by physically going to a branch or agent of issuing financial institution 110-1, using an Internet-based system run by issuing financial institution 110-1, using a phone-based system to interact with issuing financial institution 110-1, or any other system that enables communication between payor 120 and issuing financial institution 110-1 or an agent of financial institution 110-1. At the time of acquiring the money order, payor 120 may be required to provide funds in the amount of the negotiable instrument to issuing financial institution 110-1. In some instances, payor 120 will provide funds additional to the amount of the negotiated instrument as a fee for the issuing financial institution 110-1 issuing the money order.

Upon receiving the money order from issuing financial institution 110-1, payor 120 may deliver the money order to payee 130 by any physical means, such as in person, by mail, or by courier. Upon receiving the money order from payor 120, payee 130 may retain the money order for a period of time. After a time, payee 130 may bring the money order to a bank or other financial institution to be cashed or deposited, referred to collectively as a "bank of first deposit" 140-1. Payee 130 may or may not have an account at bank of first deposit 140-1. In some instances, bank of first deposit 140-1 may not even offer accounts, such as a check cashing establishment that charges a fee for cashing a check, money order, or other negotiable instrument. Upon presenting the money order to bank of first deposit 140-1, depending on certain conditions, bank of first deposit 140-1 may collect information on payee 130.

For example, if the monetary amount of the money order is greater than a certain threshold amount, bank of first deposit 140-1 may require payee 130 to identify himself, provide a driver's license, or some other identifying document. In other instances, payee 130 may not be required to provide any information to bank of first deposit 140-1. Bank of first deposit 140-1 may inspect the money order for authenticity or any signs of tampering. At this point, the money order has not cleared, however bank of first deposit 140-1 may provide the associated funds to payee 130 based upon an expectation that the money order will clear. For example, if the money order is drawn on an issuing financial institution that is known to be financially solvent and reliable, such as WESTERN UNION, bank of first deposit 140-1 may provide the funds to payee 130 immediately, with the expectation that the issuing financial institution 110-1 will provide the funds associated with the money order.

At this point, bank of first deposit 140-1 may have physical possession of the money order. Every so often, such as once a day, bank of first deposit 140-1 may forward all of the negotiable instruments, including the money order, it has received to a clearinghouse (also referred to as a check processor). This clearinghouse 150 may handle all negotiable instruments for bank of first deposit 140-1, including multiple branches of bank of first deposit 140-1. Further, clearinghouse 150 may handle negotiable instruments for other banks that function as banks of first deposit. For clarity, only one additional bank, bank of first deposit 140-2, is depicted in FIG. 1, however any number is possible. Also, clearinghouse 150 may be part of bank of first deposit 140-1, or may be an independent business entity functioning separately from bank of first deposit 140-1.

Clearinghouse 150 may then process the money order. This may include determining where to route the money order based on a routing number printed on the money order, typically an ABA routing number. This routing number may be machine-readable, such as written with magnetic ink. This may also include clearinghouse 150 imaging the money order, and converting it to an electronic file. Clearinghouse 150, after creating the electronic file containing the image of the money order, may destroy the physical money order, such that only the electronic file containing the image of the money order remains. The electronic file the money order is converted into may be in X9.37 format. The electronic file in X9.37 format may contain or be configured to contain standard data fields that are present in all X9.37 files. In some embodiments, X9.100 format files are also used. As those with skill in the art will recognize, any mention of X9.37 format files in this application may be substituted with X9.100 format files.

Clearinghouse 150 may encode the electronic file of the money order with additional information. For example, this additional information may be associated with some or all of the data fields present in the X9.37 file. Entry of data into these data fields may be mandatory or optional, depending on the particular data field. This data may include information such as: the deposit account number at the bank of first deposit 140-1, the bank of first deposit item sequence number (that is, a number indicating the order in which the money order was received by the bank of first deposit), the ECE (electronic check exchange) institution item sequence number, the endorsing bank sequence number, etc. In some instances, later institutions holding the X9.37 file may add additional information to data fields within the electronic file. Based upon the routing number or other information on the money order, clearinghouse 150 may route the electronic file containing the image of the money order to the appropriate clearinghouse associated with issuing financial institution 110-1. Therefore, clearinghouse 150 may interact with many other clearinghouses throughout the country and/or world. The routing from clearinghouse 150 to clearinghouse 160 may be via a computer-based network, such as the Internet, or some other public or private electronic network.

Clearinghouse 160 may be part of issuing financial institution 110-1, or may be independent from issuing financial institution 110-1. Also, clearinghouse 160 may function on the behalf of other financial institutions, such as issuing financial institution 110-2. For clarity, only one additional financial institution 110-2 is illustrated in FIG. 1, however any number of additional financial institutions may interact with clearinghouse 160. Upon receiving the electronic file of the money order from clearinghouse 150, clearinghouse 160 may route the money order to issuing financial institution 110-1 or may process it on behalf of issuing financial institution 110-1. Processing the money order may include verifying that the money order was in fact issued by issuing financial institution 110-1, verifying that the amount the money order was cashed for at a bank of first deposit 140-1 was the same amount that the money order was issued for by issuing financial institution 110-1, and/or that the money order appears not to be involved in any illegal, illicit, or suspicious activities. Worth noting, all the actions performed by clearinghouse 160 may be performed by issuing financial institution 110-1. Further, clearinghouse 160 and clearinghouse 150 may be the same clearinghouse.

Figure 2:
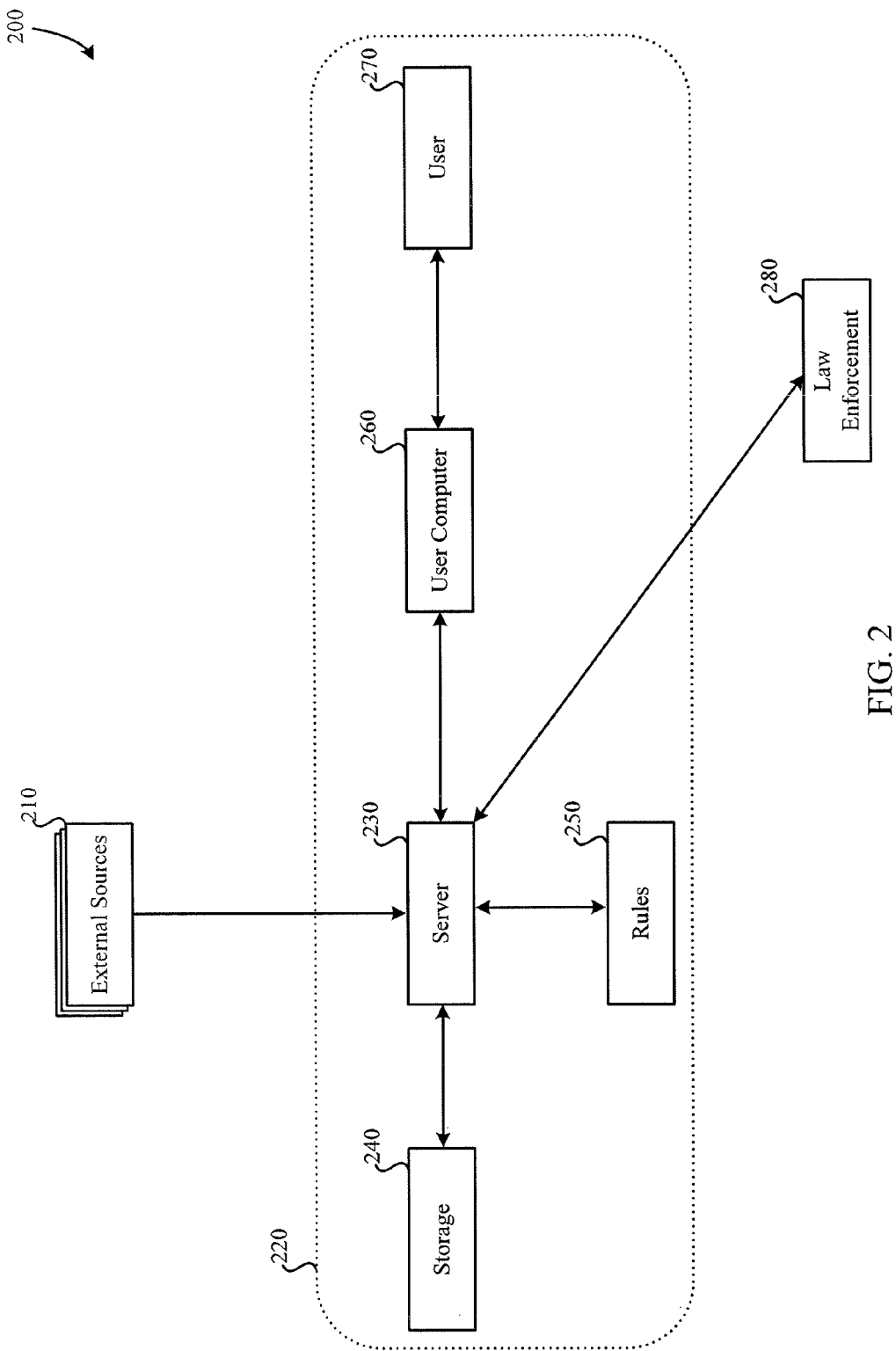
FIG. 2 is a simplified block diagram of an embodiment of a system for reviewing and/or analyzing negotiable instruments.

Within clearinghouse 160, there may be additional detail as to how money orders, checks, and other negotiable instruments are handled. FIG. 2 illustrates a simplified block diagram of an embodiment of system 200 for reviewing and analyzing negotiable instruments. Clearinghouse 220 of FIG. 2 may be clearinghouse 160 of FIG. 1, or may be some other clearinghouse. Clearinghouse 220 may have several components including, server 230, user computer 260, and storage 240. Server 230 may receive electronic files in X9.37 format from multiple external sources 210. These external sources may be other clearinghouses, such as clearinghouse 150 in FIG. 1, or other banks or financial institutions such as bank of first deposit 140-1 in FIG. 1. External sources 210, also referred to as settlement points, may send electronic files to server 230 in periodic batch transfers or in real-time as they are received by external sources 210. Individual external sources of external sources 210 may send electronic files to server 230 at different times throughout the day and/or week.

Upon receipt of the electronic files at server 230 from external sources 210, the electronic files may be processed immediately or stored for an amount of time prior to processing. Therefore, until processing and analysis, the electronic files may be stored at storage 240. Storage 240 may be any appropriate form of a computer readable storage medium, such as a hard drive, a tape drive, memory, etc.

Server 230 may have access to a set of criteria 250. These criteria may be stored on storage 240. These rules may define how various electronic files received from external sources 210 are processed, analyzed, and/or presented to a user. Server 230 may also interact with the user computer. Such a user computer 260 may be any form of computer capable of interacting with server 230 and user 270. User computer 260 may serve as a way for a user 270 to interact with the electronic files and criteria 250. Therefore, using user computer 260, user 270 may be able to adjust criteria 250 to vary how different electronic files are processed and/or analyzed. For example, if while processing and analyzing an electronic file, server 230 encounters an unexpected condition or occurrence or has detected suspicious activity, user computer 260 may display the questionable electronic file or group of electronic and associated information to user 270. Further, user 270, using user computer 260 may be able to control when server 230 processes and/or analyzes the electronic files for clearing.

Also, server 230 may have the ability to interact with an external law enforcement system 280. Upon determining that an electronic file or group of electronic files may have been involved in illegal or illicit activities, server 230 may forward the files to and/or alert law enforcement system 280. In some embodiments, prior to contacting law enforcement 280, server 230 presents the suspicious electronic files or group of electronic files to user 270 via user computer 260. Also, contact with law enforcement system 280 may be via a user computer 260, instead of server 230 as depicted in FIG. 2. In some embodiments, user 270 must personally contact law enforcement.

Figure 3:
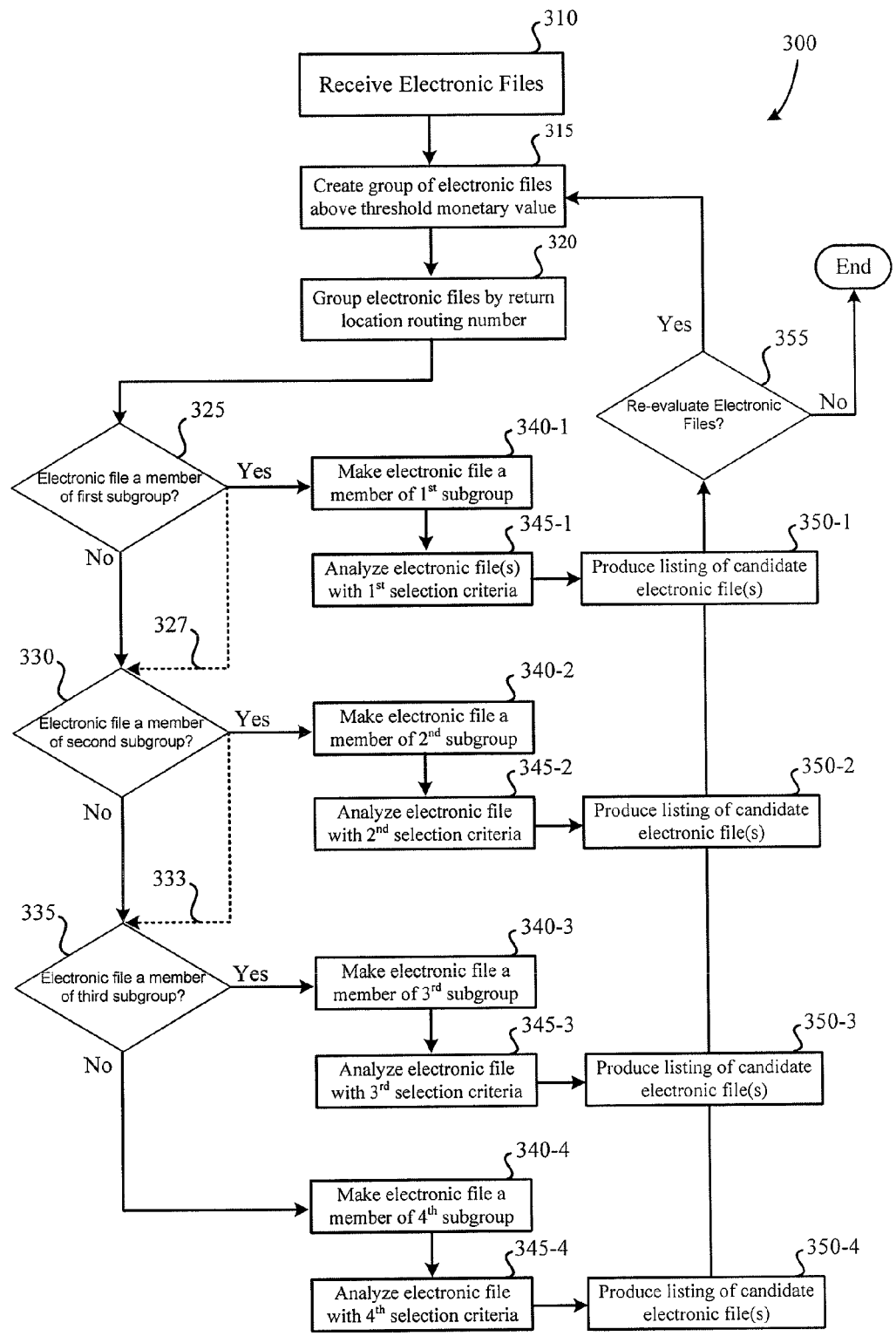
FIG. 3 is a simplified block diagram of an embodiment of a method for reviewing and/or analyzing negotiable instruments.

In determining whether to alert user 270 or law enforcement system 280, server 230 must process and/or analyze the electronic files according to a set of instructions or criteria 250. FIG. 3 provides a simplified block diagram of a possible embodiment of a processing and/or analyzing method employed by server 230. Process 300 may be used by server 230 of FIG. 2 or may be used by some other computer or server system to process, or analyze negotiable instruments for illegal activity. At block 310, electronic files are received. These electronic files may have been received from sources such as an external sources 210 of FIG. 2, or may be received from some other source. In some embodiments, at block 315, electronic files are grouped or sorted according to a threshold monetary value. In other words, electronic files containing a negotiable instrument at or above a threshold monetary value are sorted into one group, while those below the threshold monetary value are sorted into another group. This threshold monetary value may be predetermined and/or set by a user to any monetary value. Of course, the higher the threshold monetary value, the fewer negotiable instruments that may be expected to greater than the threshold monetary value.

At block 320, electronic files that were greater than the threshold monetary value evaluated at block 315, may be grouped according to their return location routing number. This returned location routing number is a value present in one of the data fields of X9.37 electronic files.

Following the electronic files being grouped by a returned location routing number at block 315, the electronic files may be evaluated and/or analyzed to determine which subgroup each electronic file should be a member of. Some electronic files may contain more data than others, due to some X9.37 data fields being optional. For example, not all data fields contained in an X9.37 electronic file will contain data. Therefore, while examining and/or analyzing electronic files based on particular data fields contained in an X9.37 file, information may not always be available in particular data fields. It may be necessary to set up a hierarchy of information or data to examine various data fields within the electronic files for varying data. These subgroups are defined such that each electronic file may only be a member of one subgroup. Therefore, in other words, for each electronic file, a first subgroup is examined, if the electronic file does not meet the qualifications for this subgroup, it is determined whether the electronic file qualifies for a second subgroup, and so on. Process 300 illustrates one possible embodiment of a hierarchy involving multiple subgroups.

First, the electronic files grouped at block 320 are evaluated at block 325 to determine if they should be made members of a first subgroup. If the answer is yes, the electronic files may be added to the first subgroup at block 340-1. The determination of whether an electronic file is a member of the first subgroup may be done according to criteria defined by a user. In most instances, the criteria used to make the decision as to whether an electronic file is a member of the first subgroup will be the criteria that most clearly identifies whether a negotiable instrument in an electronic file or negotiable instruments in a group of electronic files exhibit suspicious characteristics.

If an electronic file evaluated at block 325 is not qualified to be a member of the first subgroup (e.g., it does not have an identifier in the deposit account number at bank of first deposit field), the electronic file is evaluated to determine whether it is a member of the second subgroup at block 330. Therefore, electronic files that are members of the first subgroup may not be evaluated at block 330. The criteria to be a member of the second subgroup may be different than the criteria to be a member of the first subgroup. In some instances, the criteria or set of criteria, used to determine whether an electronic file is a member of the second subgroup is the criteria that most clearly, besides the criteria of block 325, identifies whether a negotiable instrument in an electronic file or negotiable instruments in the group of electronic files exhibit suspicious characteristics. If an electronic file qualifies to be a member of the second subgroup, it may be added to the second subgroup at block 340-2.

If an electronic file evaluated at block 330 is not qualified to be a member of the first or second subgroup, it is evaluated to determine whether it is a member of the third subgroup at block 335. Therefore, electronic files that are members of the first or second subgroup may not be evaluated at block 335. At block 340-3, these electronic files are made members of the third subgroup.

If an electronic file is not a member of the third group evaluated at block 335, the electronic file may become a member of a fourth subgroup at block 340-4. Therefore, the fourth subgroup may contain all of the electronic files that did not qualify to be a member of the first subgroup, the second subgroup, or the third subgroup. As those with skill in the art will recognize, there may be greater or fewer than four subgroups, and greater or fewer than three evaluation steps.

At this point, each electronic file that is a member of the group of electronic files above a threshold monetary value evaluated at block 315 has been made a member of a subgroup. Additional evaluation of each electronic file may now be performed on each subgroup to further narrow the field of electronic files to be investigated for suspicious activity. Various selection criteria may be applied to each subgroup. The various selection criteria applied to each subgroup may be different or may be the same as the selection criteria apply to other subgroups. At block 345-1, the members of the first subgroup are analyzed with a first set of selection criteria. This set of selection criteria may look at each electronic file separately, or may look at groups of electronic files together.

Such further investigation may occur at block 350-1. Block 350-1 may include generating a listing of all the electronic files that met the first set of selection criteria. This may include individual electronic files being listed and/or groups of related electronic files being listed. Therefore, not every member of the first subgroup may be listed as a candidate electronic file for suspicious activity at block 350-1.

At block 345-2, each electronic file of the second subgroup is analyzed according to a second set of selection criteria. This second set of selection criteria may be the same selection criteria as the first selection criteria, or may be a different set of selection criteria. Based upon an analysis according to this second set of selection criteria, an electronic file or group of electronic files may warrant further investigation. These electronic files that warrant further investigation may be listed at block 350-2. The listing generated at block 350-2 may be added to the listing of candidate electronic files produced at block 350-1. In some embodiments, the listing of candidate electronic files produced at block 350-1 is maintained separate from the listing of candidate electronic files produced at block 350-2.

As in the first subgroup and the second subgroup, a similar analysis according to a third set of selection criteria is performed on the third subgroup at block 345-3. Again, the third set of selection criteria may be the same as the first and/or the second set of selection criteria or may be different. At block 350-3 a listing of candidate electronic files analyzed according to the third set of selection criteria is created. This listing may be separate or combined with the listings produced at block 350-1 and 350-2.

There may or may not be a fourth selection criteria at block 345-4 to evaluate the fourth subgroup. As subgroup four includes all of the electronic files that did not qualify to be in the first subgroup, the second subgroup, or the third subgroup, it may not be possible to create a selection criteria capable of isolating electronic files that have evidence of suspicious activity from those that do not. This may result in every member of the fourth subgroup being added to a listing of candidate electronic files for suspicious activity at block 350-4. Alternatively, because such limited information regarding the members of the fourth subgroup may be available, none of the members of the fourth subgroup may be added to a listing of candidate electronic files at block 350-4.

Each of the listings generated at blocks 350-1, 350-2, 350-3 and 350-4 may be displayed to a user, maintained in a storage file for later investigation, and/or forwarded to law enforcement. Each of these listings may be combined into a master listing, or may be maintained separately. In some embodiments, each suspicious electronic file or group of electronic files may be displayed to a user as they are determined. Depending on the listings, a determination may be made to reevaluate the electronic files at block 355. This determination of whether to reevaluate may be made by the system evaluating the files or a user. If the electronic files are not determined to be reevaluated, this may conclude the process. If the electronic files are to be reevaluated, the process may return to block 315 to group the electronic files according to the same or a different threshold monetary value.

In some embodiments, an electronic file may be evaluated for membership in more than one subgroup. An electronic file may be permitted to be a member of up to a certain number of subgroups, of particular subgroups, or of all the subgroups. For example, if an electronic file meets the criteria at block 320 to be a member of the first subgroup and is made a member of the first subgroup at block 340-1, it may still be evaluated to determine whether it qualifies to be member of the second subgroup at block 330 (as depicted by decision arrow 327). Similarly, if an electronic file is made a member of the second subgroup at block 330, it may still be evaluated at block 335 (as depicted by decision arrow 333) for membership in the third subgroup. Therefore, if an electronic file is made a member of more than one subgroup, the electronic file may be analyzed according to multiple sets of selection criteria at multiple blocks, such as blocks 345-1 and 345-2. Accordingly, if the electronic file meets the selection criteria at either of blocks 345-1 or 345-2, it may added to a listing of candidate electronic file at blocks 350-1 and 350-2. If the electronic file qualifies to be added to both listings, the electronic file may be listed multiple times or once.

Further, if an electronic file is permitted to be a member of more than one subgroup, specific subgroups may still be excluded from evaluation depending on previous evaluation steps. For example, if an electronic file is determined to be a member of one or more of the first three subgroups at blocks 325, 330, and 335, it may not be considered for membership of the fourth subgroup. Such an arrangement may prevent an "overflow" subgroup from containing electronic files that have been added to other subgroups.

Whether or not electronic files are evaluated for membership in exclusively one subgroup or multiple subgroups, the listing(s) of candidate electronic file(s) may be presented to a user for further investigation. This listing, or multiple listings, may or may not reveal what criteria an electronic file or group of electronic files exhibited that qualified the files to be added to the listing of candidate electronic files. Not including this information may have benefits. For example, if a user is aware as to what subgroup (or subgroups) a candidate electronic file was made a member of, she may be biased to a particular verdict on whether the candidate electronic file was or was not part of suspicious, illegal, or illicit activity. In some other embodiments, the criteria by what an electronic file was added to a listing of candidate electronic files at block 350 may be included for reasons such as speeding the user's decision making process.

Figure 4:
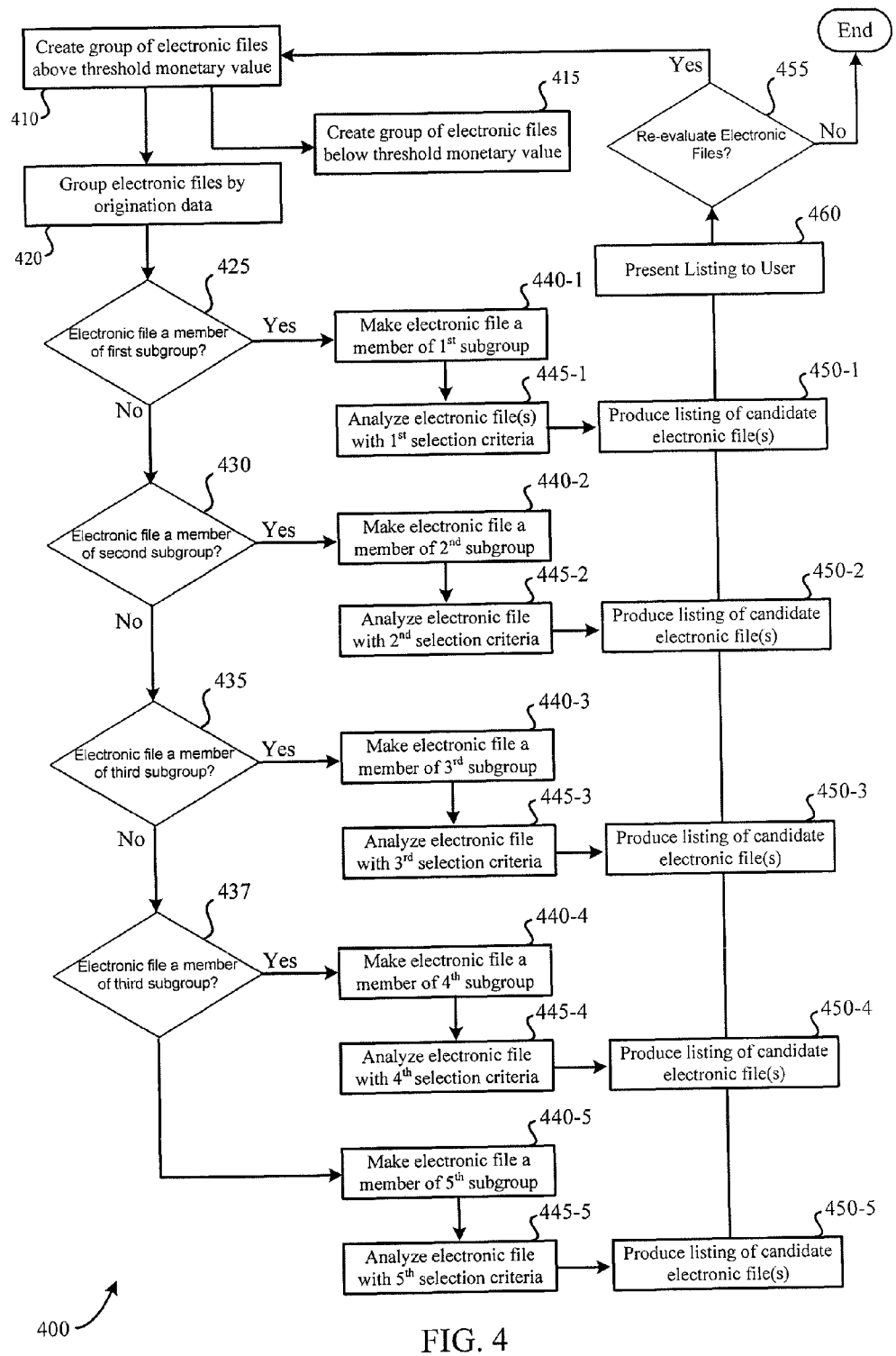
FIG. 4 is a simplified block diagram of another embodiment of a method for reviewing and/or analyzing negotiable instruments.

FIG. 4 illustrates a simplified block diagram of another embodiment of a process 400 for analyzing and/or processing electronic files containing negotiable instruments for illegal, illicit, or suspicious activity incorporating an exemplary set of evaluation and selection criteria. Process 400 of FIG. 4, may be implemented using server 230 of FIG. 2, or may be implemented using some other computer system.

At block 410, electronic files may be grouped and sorted according to a threshold monetary value. Therefore, electronic files that contain the negotiable instrument at or above the threshold monetary value may be sorted into one group, while those below the threshold monetary value may be sorted into another group, at block 415. As the threshold monetary value is increased, a decrease in the number of electronic files in the group of electronic files exceeding the threshold monetary value may be noted. Therefore, if it is desirable to evaluate only electronic files containing negotiable instruments having a relatively high value, fewer electronic files may need to be evaluated. For example, the threshold monetary value may be $1000.

The group of electronic files containing negotiable instruments at or above the threshold monetary value may then be grouped by origination data at block 420. This origination data may include the return location routing number. This return location routing number is a value present in one of the data fields (record 26, field 3) of X9.37 electronic files. If this data field is not available, additional grouping by the bank of first deposit data field (record 25, field 11) may be done. This grouping may help to separate electronic files that contain the same account number or sequence number, but are associated with unrelated banks of first deposit. For example, person 1 may have an account at CHASE BANK numbered #2727 and person 2 may have an account at WELLS FARGO numbered #2727. A comparison of only the account numbers may incorrectly assume these two accounts are the same account.

Following the electronic files being grouped by a return location routing number at block 315, the electronic files may be evaluated and/or analyzed to determine which subgroup each electronic file belongs to. Process 400 contains five subgroups which electronic files may be classified into. The general flow of process 400 of FIG. 4 may proceed similarly to process 300 of FIG. 3.

At block 425, after the group of electronic files above the threshold monetary value have been grouped according to origination data, the electronic files may be evaluated to determine whether each electronic file should be a member of the first subgroup at block 440-1. The criteria may be based on the deposit account number at the bank of first deposit data field (record 26, field 6) contained in the X9.37 file. By evaluating the deposit account number at the bank of first deposit, it may be determined what account at the bank of first deposit the funds were deposited into. Therefore, electronic files that have any identifier present in the deposit account number at the bank of first deposit data fields are made a member of the first subgroup at block 440-1.

At block 430, the electronic files that were not made a member of the first subgroup at block 425, are evaluated to determine whether each electronic files should be made a member of the second subgroup at block 440-2. The criteria may be based on whether an electronic file has data in the bank of first deposit sequence number data field (record 26, field 5).

At block 435, the electronic files that were not made a member of the second subgroup at block 430, are evaluated to determine whether each electronic file should be made a member of the third subgroup at block 440-3. The criteria for the third subgroup may be electronic files that contain a record 26, but do not have a deposit account number at the bank of first deposit (record 26, field 5) or a bank of first deposit item sequence number (record 26, field 6). The third subgroup may use additional criteria, such as electronic files that have no data in record 26, but do have a "bank of first deposit indicator" (record 25, field 11).

At block 437, the electronic files that were not made a member of the third subgroup at block 435 are evaluated to determine whether each electronic file should be made a member of the fourth subgroup at block 440-4. The criteria for the fourth subgroup may be electronic files that have a "check detail addendum C record number" (record 28, field 2) set to "01." Another criteria for the fourth subgroup may be that data regarding an "endorsing bank routing number" (record 28, field 3) be present.

The remaining electronic files, that is, the electronic files that were not made a member of the first subgroup, the second subgroup, the third subgroup, or the fourth subgroup are made a member of the fifth subgroup at block 440-5. In many instances, not enough information may be present to determine if an illegal or suspicious activity has occurred involving electronic files in this group. Few electronic files may be members of the fifth subgroup.

Therefore, at this point, each electronic file that was grouped according to origination data at block 420, has now been made a member of one subgroup. The members of each subgroup are now analyzed according to selection criteria specific to each subgroup to determine whether electronic files should be added to a listing of candidate electronic files for suspicious activity to be further investigated.

Therefore, at block 445-1 each electronic file that is a member of the first subgroup may be analyzed according to a first set of selection criteria. Electronic files, or groups of electronic files that meet the first selection criteria may be used to produce a listing of candidate electronic files for suspicious activity at block 450-1. The first set of selection criteria may evaluate the amount of monetary funds deposited in individual accounts at the bank of first deposit. A total monetary amount deposited into a particular account within a day, or some other predetermined amount of time may warrant further investigation. It may not matter whether this total monetary amount is met or exceeded by one negotiable instrument, or a series of negotiable instruments, as long as the value of the negotiable instrument is deposited into the same account at the bank of first deposit.

As an example, consider one money order for $10,000 deposited into a first account at bank 1 and 10 money orders each for $1000 deposited in a second account at bank 2. Because the total amount deposited into each account exceeds the threshold amount, the money order for $10,000 and the group of 10 money orders for $1000 each may require further investigation, and may be listed as a candidate for suspicious activity at block 450-1.

At block 445-2, each electronic file that is a member of the second subgroup may be analyzed according to a second set of selection criteria. This criteria may be applied to create groups of electronic files that are sequential according to the bank of first deposit sequence number data field in groups of $5000 or greater. These electronic files may be re-sequenced to include electronic files that were grouped separately at block 415. Further detail of this step is provided in FIG. 5 and its associated description. After inclusion of those electronic files below the threshold grouped at block 415, the electronic files of modified subgroup 2 may be again examined for sequential groups of negotiable instruments that are individually over the threshold evaluated at block 410, and form groups greater than $5000. These sequential groups of negotiable instruments may be listed as candidates for suspicious activity at block 450-2.

At block 445-3, each electronic file that is a member of the third subgroup may be analyzed according to a third set of selection criteria. The selection criteria for the third subgroup may use the "ECE Institution items sequence number" data field (record 25, field 7) to select sequential electronic files in groups of $5000 or greater. Electronic files, or groups of electronic files that meet the third selection criteria may be used to produce a listing of candidate electronic files for suspicious activity at block 450-3.

At block 445-4, each electronic file that is a member of the fourth subgroup may be analyzed according to a fourth set of selection criteria. The selection criteria for the fourth subgroup may use the "Endorsing bank sequence number" data field (record 28, field 5) to select sequential electronic files in groups of $5000 or greater. Electronic files, or groups of electronic files that meet the fourth selection criteria may be used to produce a listing of candidate electronic files for suspicious activity at block 450-4.

At block 445-5, each electronic file that is a member of the fifth subgroup may be analyzed according to a fifth set of selection criteria. Each member of the fifth subgroup may have limited information available regarding the negotiable instrument, otherwise these negotiable instruments may have been made members of the first, second, third, or fourth subgroups. Due to limited information being available analysis may not be performed according to fifth set of selection criteria at block 445-4. As a result, none, some, or all members of the fifth subgroup may be used to produce a listing of candidate electronic files for further investigation at block 450-5.

The listings of candidate electronic files for suspicious, illegal, or illicit activity at blocks 450-1, 450-2, 450-3, 450-4, and 450-5 may be separate listings or may be one combined listing. These listings or listing may then be forwarded to a user for review at block 460 via a user computer, such as that illustrated in FIG. 2, or may be forwarded to law enforcement.

Following the listings or listing being presented to a user, the electronic files may be reevaluated at block 455. If reevaluation, as determined either by the system according to predetermined criteria, or as determined by the user, is unnecessary, the process may conclude. Otherwise, the reevaluation process may return to block 410 and repeat the analysis.

Figure 5:
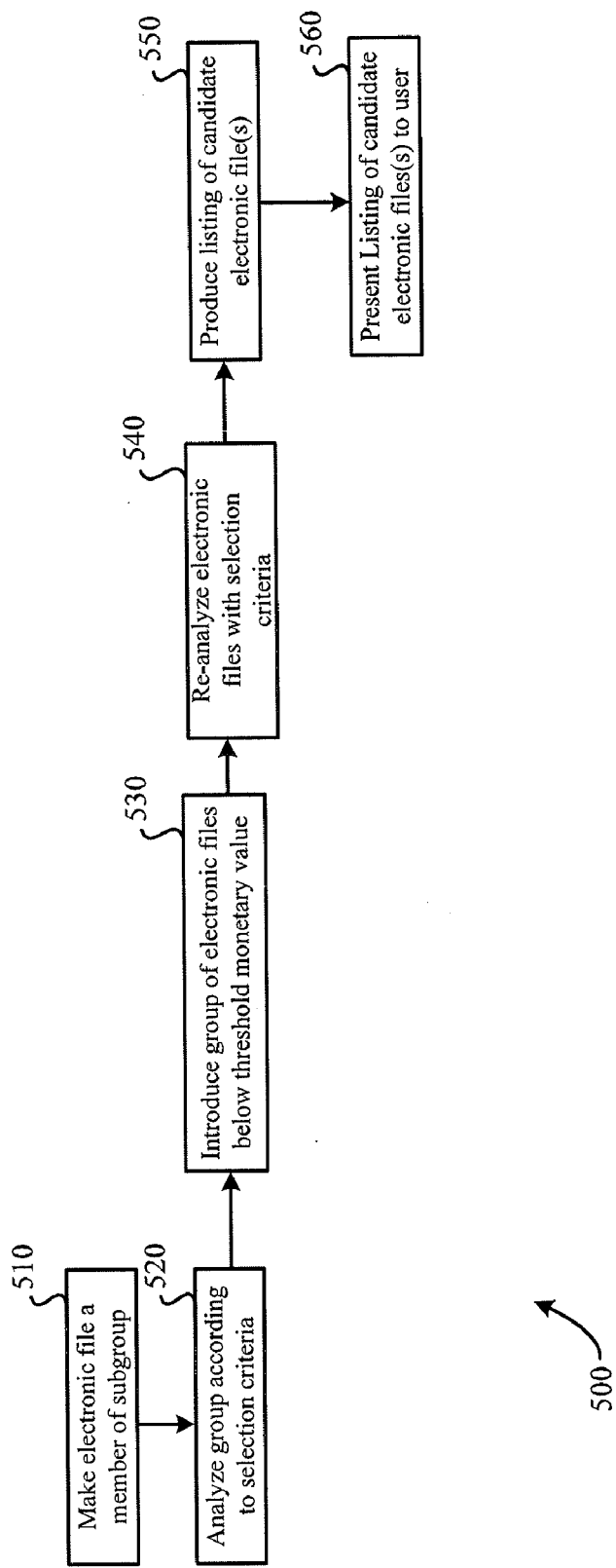
FIG. 5 is a simplified block diagram of an embodiment of a method for reviewing and/or analyzing a subgroup of negotiable instruments.

Analysis according to sets of selection criteria may involve also evaluating electronic files that were below the threshold monetary value as groups at block 415, such as in subgroup 2 of FIG. 4. FIG. 5 illustrates a process 500 that may be a part of a process, such as process 400, utilizing electronic files having a monetary value below the thresholds as groups at block 415. For example at block 510, an electronic file (that exceeds the threshold monetary value) may be made a member of a subgroup. This group may then be evaluated according to its associated selection criteria, at block 520. It may then be necessary to incorporate electronic files that were initially excluded because they were below the threshold monetary value at block 530. This may be because the sequence in which the negotiable instruments were submitted to the bank of first deposit needs to be analyzed.

Following the introduction of electronic files below the threshold monetary value, the electronic files, including those both above and below the threshold monetary value, may be evaluated according to selection criteria at block 540. The selection criteria may be the same selection criteria as that evaluated at block 520, or may be different selection criteria. Following this, as in FIG. 4, a listing of individual candidate electronic files or groups of candidate electronic files for suspicious, illicit, or illegal activity may be produced at block 550. At block 560, this listing of candidate electronic files may be presented to a user or forwarded to law enforcement, as described in detail with regards to FIGS. 3 and 4.

It is also important to note, that as in FIG. 3 with respect to decision arrows 327 and 333, some embodiments of methods and systems employing the process 400 may evaluate electronic files for membership in more than one subgroup. Therefore, as an example, if an electronic file is made a member of the first subgroup, it may also be made a member of the second, third, fourth, and/or fifth subgroup, and be evaluated according to multiple sets of selection criteria.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for analyzing electronic images of negotiable instruments, the method comprising:
   receiving, by a computer system, a plurality of electronic files, wherein:
      each electronic file of the plurality of electronic files comprises an image of a negotiable instrument, and
      each electronic file of the plurality of electronic files includes a plurality of data fields;
   identifying, by the computer system, a first group of electronic files selected from the plurality of electronic files, wherein each of the electronic files in the first group corresponds to a negotiable instrument that exceeds a threshold monetary value;
   sorting, by the computer system, the electronic files of the first group of electronic files into a plurality of subgroups, wherein each electronic file of the first group of electronic files is sorted into at least one subgroup; and
   identifying, by the computer system, candidates for further analysis from each subgroup of electronic files according to selection criteria, wherein the selection criteria applied to each subgroup vary.

2. The method of claim 1 for analyzing electronic images of negotiable instruments, wherein the first subgroup is sorted based on return location routing numbers.

3. The method of claim 1 for analyzing electronic images of negotiable instruments, wherein the first subgroup is sorted based on deposit account numbers at banks of first deposit.

4. The method of claim 1 for analyzing electronic images of negotiable instruments, wherein the selection criteria applied to a first subgroup of the plurality of subgroups uses a total monetary amount of monetary value deposited in a particular deposit account.

5. The method of claim 4 for analyzing electronic images of negotiable instruments, wherein sorting the first group of electronic files into the plurality of subgroups includes determining whether each electronic file of the first group is a member of the first subgroup prior to determine whether each electronic file of the first group is a member of a second subgroup.

6. The method of claim 1 for analyzing electronic images of negotiable instruments, wherein a subgroup of the plurality of subgroups is used for electronic files that were not sorted into any other subgroup of the plurality of subgroups, thereby functioning as an overflow subgroup.

7. The method of claim 1 for analyzing electronic images of negotiable instruments, wherein the negotiable instrument is a check.

8. The method of claim 1 for analyzing electronic images of negotiable instruments, wherein the negotiable instrument is a money order.

9. The method of claim 2 for analyzing electronic images of negotiable instruments, wherein the plurality of electronic files are in X9.37 format.

10. A computer program product residing on a non-transitory processor-readable medium for analyzing electronic images of negotiable instruments, the computer program product comprising processor-readable instructions configured to cause a processor to:
   identify a first group of electronic files selected from a plurality of electronic files, wherein each of the electronic files in the first group corresponds to a negotiable instrument that exceeds a threshold monetary value, wherein:
      each electronic file of the plurality of electronic files comprises an image of a negotiable instrument, and
      each electronic file of the plurality of electronic files includes a plurality of data fields;
   sort the electronic files of the first group of electronic files into a plurality of subgroups, wherein each electronic file of the first group of electronic files is sorted into at least one subgroup; and
   identify candidates for further analysis from each subgroup of electronic files according to selection criteria, wherein the selection criteria applied to each subgroup vary.

11. The computer program product of claim 10 for analyzing electronic images of negotiable instruments, wherein the first subgroup is sorted based on a return location routing number.

12. The computer program product of claim 10 for analyzing electronic images of negotiable instruments, wherein the first subgroup is sorted based on deposit account numbers at banks of first deposit.

13. The computer program product of claim 10 for analyzing electronic images of negotiable instruments, wherein the selection criteria applied to a first subgroup of the plurality of subgroups uses a total monetary amount of monetary value deposited in a particular deposit account.

14. The computer program product of claim 13 for analyzing electronic images of negotiable instruments, wherein sorting the first group of electronic files into the plurality of subgroups includes determining whether each electronic file of the first group is a member of the first subgroup prior to determining whether each electronic file of the first group is a member of a second subgroup.

15. The computer program product of claim 10 for analyzing electronic images of negotiable instruments, wherein a subgroup of the plurality of subgroups is used for electronic files that were not sorted into any other subgroup of the plurality of subgroups, thereby functioning as an overflow subgroup.

16. The computer program product of claim 10 for analyzing electronic images of negotiable instruments, wherein the negotiable instrument is a check.

17. The computer program product of claim 10 for analyzing electronic images of negotiable instruments, wherein the negotiable instrument is a money order.

18. The computer program product of claim 10 for analyzing electronic images of negotiable instruments, wherein the plurality of electronic files are in X9.37 format.

19. A system for analyzing electronic images of negotiable instruments, the system comprising:
   a processor; and
   a memory communicatively coupled with and readable by the processor and having stored therein processor-readable instructions which, when executed by the processor, cause the processor to:

identify a first group of electronic files selected from a plurality of electronic files, wherein each of the electronic files in the first group corresponds to a negotiable instrument that exceeds a threshold monetary value, wherein:
  each electronic file of the plurality of electronic files comprises an electronic image of a negotiable instrument, and
  each electronic file of the plurality of electronic files includes a plurality of data fields;
sort the electronic files of the first group of electronic files into a plurality of subgroups, wherein each electronic file of the first group of electronic files is sorted into at least one subgroup; and
identify candidates for further analysis from each subgroup of electronic files according to selection criteria, wherein the selection criteria applied to each subgroup vary.

20. The system of claim 19 for analyzing electronic images of negotiable instruments, wherein the first subgroup is sorted based on deposit account numbers at banks of first deposit.

* * * * *

UNITED STATES PATENT AND TRADEMARK OFFICE
CERTIFICATE OF CORRECTION

PATENT NO. : 8,266,033 B2  Page 1 of 1
APPLICATION NO. : 13/405831
DATED : September 11, 2012
INVENTOR(S) : Jeannie Larsen et al.

It is certified that error appears in the above-identified patent and that said Letters Patent is hereby corrected as shown below:

In the Claims:

Column 17, in Claim 9, line 57, please delete "claim 2" and insert --claim 1--.

Signed and Sealed this
Twenty-seventh Day of November, 2012

David J. Kappos
*Director of the United States Patent and Trademark Office*